(12) United States Patent
Yeo et al.

(10) Patent No.: US 10,586,127 B1
(45) Date of Patent: Mar. 10, 2020

(54) EXTRACTING AUDIOVISUAL FEATURES FROM CONTENT ELEMENTS ON ONLINE DOCUMENTS

(71) Applicant: Google Inc., Mountain View, CA (US)

(72) Inventors: Boon-Lock Yeo, Mountain View, CA (US); Xuemei Gu, Mountain View, CA (US); Gangjiang Li, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/190,897

(22) Filed: Jun. 23, 2016

Related U.S. Application Data

(63) Continuation of application No. 13/295,507, filed on Nov. 14, 2011, now abandoned.

(51) Int. Cl.
  *G06K 9/46* (2006.01)
  *G10L 19/018* (2013.01)

(52) U.S. Cl.
  CPC .......... *G06K 9/4671* (2013.01); *G10L 19/018* (2013.01)

(58) Field of Classification Search
  None
  See application file for complete search history.

(56) References Cited

U.S. PATENT DOCUMENTS

| | | |
|---|---|---|
| 5,418,713 A | 5/1995 | Allen |
| 5,498,002 A | 3/1996 | Gechter |
| 5,572,643 A | 11/1996 | Judson |
| 5,602,565 A | 2/1997 | Takeuchi |
| 5,634,850 A | 6/1997 | Kitahara et al. |
| 5,682,511 A | 10/1997 | Sposato et al. |
| 5,748,173 A | 5/1998 | Gur |
| 5,774,664 A | 6/1998 | Hidary et al. |

(Continued)

FOREIGN PATENT DOCUMENTS

| | | |
|---|---|---|
| EP | 0 408 348 A2 | 1/1991 |
| JP | 2007-072712 A | 3/2007 |

(Continued)

OTHER PUBLICATIONS

U.S. Final Office Action for U.S. Appl. No. 13/295,507 dated Oct. 30, 2013.

(Continued)

*Primary Examiner* — Michelle M Entezari
(74) *Attorney, Agent, or Firm* — Foley & Lardner LLP

(57) ABSTRACT

Systems and methods for extracting audiovisual features from online document elements are described herein. A computing device can identify a first audiovisual content element on an online document and can retrieve a second audiovisual content element from a content provider database. The computing device can extract an image, video, or audio feature from the first and the second audiovisual content elements by applying image feature, video frame feature, or audio fingerprint detection. The computing device can determine a match between the features extracted from the first and the second audiovisual content elements. The computing device can select the second audiovisual content element for display on the online document based on the match. The computing device can transmit the second audiovisual content element for insertion in a content slot of the online document.

16 Claims, 7 Drawing Sheets

(56) References Cited

U.S. PATENT DOCUMENTS

| | | |
|---|---|---|
| 5,778,181 A | 7/1998 | Hidary et al. |
| 5,831,591 A | 11/1998 | Suh |
| 5,845,263 A | 12/1998 | Camaisa et al. |
| 5,856,821 A | 1/1999 | Funahashi |
| 6,011,537 A | 1/2000 | Slotznick |
| 6,018,768 A | 1/2000 | Ullman et al. |
| 6,026,373 A | 2/2000 | Goodwin, III |
| 6,185,558 B1 | 2/2001 | Bowman et al. |
| 6,199,060 B1 | 3/2001 | Gustman |
| 6,275,806 B1 | 8/2001 | Pertrushin |
| 6,320,602 B1 | 11/2001 | Burkardt et al. |
| 6,505,169 B1 | 1/2003 | Bhagavath et al. |
| 6,510,553 B1 | 1/2003 | Hazra |
| 6,570,587 B1 | 5/2003 | Efrat et al. |
| 6,591,247 B2 | 7/2003 | Stern |
| 6,642,940 B1 | 11/2003 | Dakss et al. |
| 6,684,249 B1 | 1/2004 | Frerichs et al. |
| 6,823,495 B1 | 11/2004 | Vedula et al. |
| 6,857,007 B1 | 2/2005 | Bloomfield |
| 6,947,531 B1 | 9/2005 | Lewis et al. |
| 7,124,101 B1 | 10/2006 | Mikurak |
| 7,158,676 B1 | 1/2007 | Rainsford |
| 7,526,786 B1 | 4/2009 | Adams et al. |
| 7,647,242 B2 | 1/2010 | Bem |
| 7,660,815 B1 | 2/2010 | Scofield et al. |
| 7,668,821 B1 | 2/2010 | Donsbach et al. |
| 7,831,472 B2 | 11/2010 | Yufik |
| 7,853,255 B2 | 12/2010 | Karaoguz et al. |
| 7,979,459 B2 | 7/2011 | Wu et al. |
| 8,065,611 B1 | 11/2011 | Chan et al. |
| 8,073,868 B2 | 12/2011 | Lavi |
| 8,108,253 B2 | 1/2012 | Poon et al. |
| 8,126,766 B2 | 2/2012 | Alexander |
| 8,135,619 B2 | 3/2012 | Bem |
| 8,195,133 B2 | 6/2012 | Ramer et al. |
| 8,301,499 B2 | 10/2012 | Moissinac et al. |
| 8,386,386 B1 | 2/2013 | Zhu |
| 8,391,618 B1 | 3/2013 | Chuang et al. |
| 8,463,783 B1 | 6/2013 | Yagnik |
| 8,688,514 B1 | 4/2014 | Sarkar et al. |
| 8,903,716 B2 | 12/2014 | Chen et al. |
| 9,189,514 B1* | 11/2015 | Myslinski .......... G06Q 30/0255 |
| 9,304,738 B1* | 4/2016 | Xu .......................... G06F 16/00 |
| 9,535,887 B2* | 1/2017 | Ozgul .................. G06F 17/212 |
| 9,875,740 B1 | 1/2018 | Kumar et al. |
| 9,959,129 B2 | 5/2018 | Kannan et al. |
| 10,056,078 B1 | 8/2018 | Shepherd et al. |
| 10,068,573 B1 | 9/2018 | Aykac et al. |
| 2001/0045948 A1 | 11/2001 | Shiiyama |
| 2002/0032603 A1 | 3/2002 | Yeiser |
| 2002/0053078 A1 | 5/2002 | Holtz et al. |
| 2002/0065722 A1 | 5/2002 | Hubbard et al. |
| 2002/0133571 A1 | 9/2002 | Jacob et al. |
| 2003/0018541 A1 | 1/2003 | Nohr |
| 2003/0028873 A1* | 2/2003 | Lemmons .......... H04N 7/17318 725/36 |
| 2003/0033161 A1 | 2/2003 | Walker et al. |
| 2003/0040957 A1 | 2/2003 | Rodriguez et al. |
| 2003/0074662 A1 | 4/2003 | Istvan et al. |
| 2003/0187844 A1 | 10/2003 | Li et al. |
| 2004/0044569 A1 | 3/2004 | Roberts et al. |
| 2004/0260621 A1 | 12/2004 | Foster et al. |
| 2005/0125683 A1 | 6/2005 | Matsuyama et al. |
| 2005/0138016 A1 | 6/2005 | Matsuyama et al. |
| 2005/0187823 A1 | 8/2005 | Howes |
| 2005/0188400 A1 | 8/2005 | Topel |
| 2005/0220439 A1 | 10/2005 | Carton et al. |
| 2005/0261968 A1 | 11/2005 | Randall et al. |
| 2005/0288096 A1 | 12/2005 | Walker et al. |
| 2006/0004627 A1 | 1/2006 | Baluja |
| 2006/0064411 A1 | 3/2006 | Gross et al. |
| 2006/0293995 A1 | 12/2006 | Borgs et al. |
| 2007/0094042 A1 | 4/2007 | Ramer et al. |
| 2007/0094081 A1 | 4/2007 | Yruski et al. |
| 2007/0097975 A1 | 5/2007 | Rakers et al. |
| 2007/0123222 A1 | 5/2007 | Cox et al. |
| 2007/0127688 A1 | 6/2007 | Doulton |
| 2007/0174258 A1 | 7/2007 | Jones et al. |
| 2007/0288309 A1 | 12/2007 | Haberman et al. |
| 2008/0060001 A1 | 3/2008 | Logan et al. |
| 2008/0066107 A1 | 3/2008 | Moonka et al. |
| 2008/0086368 A1 | 4/2008 | Bauman et al. |
| 2008/0091537 A1 | 4/2008 | Miller et al. |
| 2008/0107404 A1 | 5/2008 | Nakamura et al. |
| 2008/0109306 A1 | 5/2008 | Maigret et al. |
| 2008/0172422 A1* | 7/2008 | Li ..................... G06F 17/30867 |
| 2008/0187279 A1 | 8/2008 | Gilley et al. |
| 2008/0201220 A1 | 8/2008 | Broder et al. |
| 2008/0222132 A1 | 9/2008 | Pan et al. |
| 2008/0235087 A1 | 9/2008 | Amento et al. |
| 2008/0243821 A1 | 10/2008 | Delli Santi et al. |
| 2008/0263583 A1 | 10/2008 | Heath |
| 2008/0268876 A1 | 10/2008 | Gelfand et al. |
| 2008/0270538 A1 | 10/2008 | Garg et al. |
| 2008/0319844 A1* | 12/2008 | Hua ....................... G06Q 30/02 705/14.73 |
| 2009/0163227 A1 | 6/2009 | Collins |
| 2009/0179900 A1 | 7/2009 | Petrovic et al. |
| 2009/0254971 A1 | 10/2009 | Herz et al. |
| 2009/0265236 A1 | 10/2009 | Schultz et al. |
| 2009/0307013 A1 | 12/2009 | Altounian et al. |
| 2010/0094686 A1* | 4/2010 | Henshaw ............... G06Q 10/02 725/13 |
| 2010/0104145 A1 | 4/2010 | Momosaki |
| 2010/0111196 A1 | 5/2010 | Lynch et al. |
| 2010/0287056 A1 | 11/2010 | Koningstein et al. |
| 2010/0290699 A1 | 11/2010 | Adam et al. |
| 2011/0161130 A1 | 6/2011 | Whalin et al. |
| 2011/0208822 A1 | 8/2011 | Rathod |
| 2011/0238500 A1 | 9/2011 | Kim |
| 2011/0246285 A1 | 10/2011 | Ratnaparkhi et al. |
| 2011/0295847 A1 | 12/2011 | Cucerzan et al. |
| 2012/0054015 A1 | 3/2012 | Wu |
| 2012/0059713 A1 | 3/2012 | Galas et al. |
| 2012/0072280 A1* | 3/2012 | Lin ....................... G06Q 30/00 705/14.45 |
| 2012/0095828 A1 | 4/2012 | Evankovich et al. |
| 2012/0150657 A1 | 6/2012 | Rubinstein et al. |
| 2012/0159620 A1* | 6/2012 | Seifert ................. H04L 63/1416 726/22 |
| 2012/0265528 A1 | 10/2012 | Gruber et al. |
| 2012/0265761 A1* | 10/2012 | Atsmon ............... G06F 17/3028 707/740 |
| 2013/0091453 A1 | 4/2013 | Kotler et al. |
| 2013/0117022 A1 | 5/2013 | Chen et al. |
| 2013/0268507 A1 | 10/2013 | MacBeth et al. |
| 2013/0272570 A1 | 10/2013 | Sheng et al. |
| 2013/0275164 A1 | 10/2013 | Gruber et al. |
| 2013/0304758 A1 | 11/2013 | Gruber et al. |
| 2013/0318089 A1 | 11/2013 | Tan et al. |
| 2014/0222436 A1 | 8/2014 | Binder et al. |
| 2014/0278411 A1 | 9/2014 | Cheung |
| 2014/0278528 A1 | 9/2014 | Simha et al. |
| 2014/0280015 A1 | 9/2014 | Marantz et al. |
| 2014/0324851 A1 | 10/2014 | Tholiya et al. |
| 2014/0351241 A1 | 11/2014 | Leask et al. |
| 2014/0351261 A1 | 11/2014 | Aswani et al. |
| 2015/0161147 A1* | 6/2015 | Zhao .................... G06F 17/3079 707/772 |
| 2015/0199731 A1* | 7/2015 | Jevtic .................. G06Q 30/0243 705/14.73 |
| 2015/0227504 A1* | 8/2015 | Zhang ..................... G06F 7/24 707/752 |
| 2015/0256633 A1* | 9/2015 | Chand ................. G06K 9/00536 382/103 |
| 2015/0278878 A1* | 10/2015 | Chau ................... G06Q 30/0276 705/14.72 |
| 2015/0370914 A1* | 12/2015 | Carroll ............. G06F 17/30905 709/203 |
| 2016/0063106 A1 | 3/2016 | Chai et al. |
| 2016/0104212 A1* | 4/2016 | Saligrama ......... G06F 17/30265 705/14.54 |
| 2016/0210689 A1* | 7/2016 | Hummel ................. G06Q 30/08 |

(56) References Cited

U.S. PATENT DOCUMENTS

| | | | |
|---|---|---|---|
| 2016/0212455 A1* | 7/2016 | Manna | G06Q 30/02 |
| 2016/0315995 A1 | 10/2016 | Hausler et al. | |
| 2017/0024766 A1* | 1/2017 | Thomson | G06F 17/30861 |
| 2017/0061515 A1* | 3/2017 | Hummel | G06F 16/248 |
| 2017/0076316 A1* | 3/2017 | Heffernan | G06Q 30/0241 |
| 2017/0092278 A1 | 3/2017 | Evermann et al. | |
| 2017/0110130 A1 | 4/2017 | Sharifi et al. | |
| 2017/0110144 A1 | 4/2017 | Sharifi et al. | |
| 2017/0132019 A1 | 5/2017 | Karashchuk et al. | |
| 2017/0178686 A1* | 6/2017 | Li | G11B 27/036 |
| 2017/0323230 A1* | 11/2017 | Bailey | G06Q 10/063 |
| 2017/0358301 A1 | 12/2017 | Raitio et al. | |
| 2018/0040020 A1* | 2/2018 | Kurian | G06Q 30/0256 |
| 2018/0097940 A1 | 4/2018 | Beilis et al. | |
| 2018/0277113 A1 | 9/2018 | Hartung et al. | |
| 2018/0300745 A1* | 10/2018 | Aubespin | G06Q 30/0241 |

FOREIGN PATENT DOCUMENTS

| | | |
|---|---|---|
| JP | 2009-048446 A | 3/2009 |
| KR | 10-2000-0017807 A | 4/2000 |
| WO | WO-02/37470 | 5/2002 |
| WO | WO-02/080555 A2 | 10/2002 |
| WO | WO-2018/125299 A1 | 7/2018 |

OTHER PUBLICATIONS

U.S. Non Final Office Action for U.S. Appl. No. 13/295,507 dated May 10, 2013.
U.S. Office Action dated Jul. 23, 2015.
U.S. Office Action on U.S. Appl. No. 13/295,507 dated Mar. 24, 2016.
"CrunchBase ScanScout," [online] [Retrieved on Mar. 11, 2011]; Retrieved from the Internet URL: http://www.crunchbase.com/company/ScanScout; 3 pages.
"Introducing Adap.tv for Advertisers," [online][Retrieved on Mar. 11, 2011]; Retrieved from the internet URL: http://www.adap.tv/demo.html; 1 page.
"MeToday Jul. 4, 2007," [online] [Retrieved on Mar. 11, 2011]; Retrieved from the Internet, URL: http://www.viddler.com/explore/djsteen/videos/27/; 1 page.
"Ooyala Blog: Create the Group," [online][Retrieved on Mar. 11, 2011]; Retrieved from the Internet URL: http//www.ooyala.com/blog; 11 pages.
"Walmart and Google to offer voice-enabled shopping", BBC News, Aug. 23, 2017.
"What's Hot on Shopping.com," [online][Retrieved on Mar. 11, 2011]; Retrieved from the Internet URL; shopping.com; 2 pages.
Amazon, "Echo Look | Hands-Free Camera and Style Assistant", reprinted from https://www.amazon.com/gp/product/B0186JAEWK?ref%5F=cm%5Fsw%5Fr%5Ffa%5Fdp%5Ft2%5FC5oazbJTKCB18&pldnSite=1 on Aug. 22, 2017 (7 pages).
Anonymous, "Microsoft for Digital Advertising Industry", PR Newswire, New York, Jan. 13, 2006, pp. 1-4. ProQuest Document ID 968489271.
Arrington, Michael, "Hulu Makes First Acquisition; Chinese Video Startup to Form Backbone of New Service," [online] [Retrieved on Mar. 11, 2011]; Retrieved from the Internet URL: http://www.techcrunch.com/2007/09/12/hulu-makes-first-acquisition-chinese-video-startup-to-form-backbone-of-new-service/; 6 pages.
Arrington, Michael, "TechCrunch—AdBrite Makes Brilliant Video Product," [online][Retrieved on Mar. 11, 2011]; Retrieved from the Internet URL: http://www.techcrunch.com/2007/1/4/adbrite-makes-brilliant-video-product; 12 pages.
Arrington, Michael, "TechCrunch—Cisco and Click.tv?," [online][Retrieved on Mar. 11, 2011]; Retrieved from the Internet URL: http://www.techcrunch.com/2007/07/30/cisco-and-clicktv/; 4 pages.
Arrington, Michael, "TechCrunch—Click.tv Moves Video Ideas Forward," [online][Retrieved on Mar. 11, 2011] Retrieved from the Internet URL: http://www.techcrunch.com/2006/04/16/clicktv-moves-video-ideas-forward/; 6 pages.
Arrington, Michael, "TechCrunch—FuckedCompany's Adbrite Spawn Goes 2.0," [online][Retrieved on Mar. 11, 2011]; Retrieved from the Internet URL: http://www.techcrunch.com/2007/01/04/adbrite-makes-brilliant-video-product; 5 pages.
Asterpix Interactive Video, 'Introducing Hypervideo', [online] [retrieved on Nov. 26, 2007]. Retrieved from http://www.asterpix.com/help/learnmore/introducing/.
Broussard, Mitchel, "Chatbot-Like Siri Patent Includes Intelligent Image, Video, and Audio Recognition Within Messages", May 11, 2017, 11 pages.
Chen, Yilun Lulu, "Alibaba Challenges Google, Amazon With New Echo-Like Device", Bloomberg, Jul. 5, 2017, 3 pages.
Close, "Amazon Echo Will Give You These Deals If You Order Through Alexa This Weekend," Web Article, Nov. 18, 2016, Time. com (2 pages).
Clover, Juli, "Amazon and Google Want to Turn Their Smart Home Speakers Into Telephone Replacements", MacRumors, Feb. 15, 2017 (5 pages).
Collins, et al., "Can Twitter Save Itself?", cnet, Apr. 26, 2017, reprinted from https://www.cnet.com/news/twitter-q1-2017-earnings/ on Aug. 22, 2017 (2 pages).
Cook, "A Siri for advertising: These mobile ads talk back to you," Web Article, Apr. 1, 2013, Geekwire.com (7 pages).
Crist, Ry, "Logitech Harmony's Alexa Skill just got a whole lot better", cnet, Jul. 13, 2017 (2 pages).
CrunchBase Company Profile, 'ScanScout', Jul. 24, 2007 [online][retrieved on Nov. 26, 2007]. Retrieved from http://www.crunchbase.com/company/ScanScout.
Dominguez, C., 'BroadRamp technology will make TV shows virtual mall', San Antonio Business Journal, Jun. 11, 2007, [online] [retrieved on Nov. 26, 2007]. Retrieved from http://cincinnati.bizjournals.com/sanantonio/stories/2007/06/11story2.html?t=printable.
Dominguez, Catherine, "BroadRamp technology will make TV shows virtual mall", San Antonio Business Journal, The Essential Business Tool, Jun. 11, 2007, pp. 1-3, http://sanantonio.bizjournals.com/sanantonio/stories/2007/06/11/story3.html.
Dominguez, Catherine, "BroadRamp technology will make TV shows virtual mall." [online][Retrieved on Mar. 16, 2011]; Retrieved from the Internet URL: http//www.bizjournals.com/sanantonio/stories/2007/06/11/sotry3.html; 3 pages.
Forrest, Conner, "Essential Home wants to be 'bridge' between Amazon Alexa, Apple's Siri, and Google Assistant," TechRepublic, May 31, 2017, 9 pages.
Foxx, Chris, "Apple reveals HomePod smart speaker", BBC, Jun. 5, 2017, 9 pages.
Gebhart, Andrew, "Google Assistant is spreading, but it needs its own 'Echo Dot'", Cnet, May 20, 2017, 6 pages.
Gebhart, Andrew, "Google Home to the Amazon Echo: 'Anything you can do . . . '", cnet, May 18, 2017 (7 pages).
Gibbs, Samuel, "Your Facebook Messenger app is about to be filled with ads", The Guardian, Jul. 12, 2017 (3 pages).
Golgowski, Nina, "This Burger King Ad Is Trying to Control Your Google Home Device", Huffpost, Apr. 12, 2017 (7 pages).
Gonzalez, Nick, "TechCrunch—Video Ads: Every Startup Has a Different Solution," [online][Retrieved on Mar. 11, 2011]; Retrieved from the Internet URL: http://www.techcrunch.com/2007/07/06/video-ads-somebody-needs-to-solve-this-problem/; 8 pages.
Gonzalez, Nick, "TechCrunch—YuMe Closes $9 Million Series B," [online] [Retrieved on Mar. 16, 2011]: Retrieved from the Internet URL: http://techcrunch.com/2007/10/16/yume-closes-9-million-series-b/; 1 page.
Google Developers Newsletter "Google Assistant SDK", developers.google.com, retrieved on Jul. 12, 2017, 2 pages.
Gurma, Mark and Webb, Alex, "Apple Is Manufacturing a Siri Speaker to Outdo Google and Amazon", Bloomberg, May 31, 2017, 3 pages.
Hardwick, Tim, "Facebook Smart Speaker Coming Next Year With 15-inch Touch Panel", MacRumors, Jul. 25, 2017 (5 pages).

(56) References Cited

OTHER PUBLICATIONS

Hendrickson, Mark, "TechCrunch—Time Warner Invests in Video Ads Startup ScanScout,", [online] [Retrieved on Mar. 11, 2011]; Retrieved from the Internet URL: http://www.techcrunch.com/2007/09/09/time-warner-backs-video-ads-through=scanscout/; 6 pages.
International Preliminary Report on Patentablity for PCT/US2008/084982 dated Jun. 10, 2010, 5 pages.
International Search Report and Written Opinion on PCT Application PCT/US2008/84982, dated Jun. 23, 2009, 8 pages.
Kelion, Leo, "Amazon's race to make Alexa smarter", BBC News, Jul. 28, 2017 (8 pages).
Koetsier, John, "Ads on Amazon Echo: Wendy's, ESPN, and Progressive Among Brands Testing", Forbes, May 11, 2017, 3 pages.
Larson, Selena, "Google Home now recognizes your individual voice", CNN Money, San Francisco, California, Apr. 20, 2017 (3 pages).
Lee, Dave, "The five big announcements from Google I/O", BBC, May 18, 2017, 11 pages.
Lund, Pamela, Mastering Google Product Feeds and Product Listing Ads—Part 1, found at http://www.blueglass.com/blog/mastering-google-product-feeds-and-product-listing-ads-part-1/#comments, Dec. 28, 2013, 17 pages.
Nieva, Richard, "Google Home and eBay can tell you how much that's worth", cnet, Mar. 8, 2017 (3 pages).
Notice of Allowance for U.S. Appl. No. 13/490,912, dated Jan. 7, 2014,17 pages.
Ooyala, 'Overview', [online] [retrieved on Nov. 26, 2007]. Retrieved from http://www.ooyala.com/about.
Patently Apple, "Apple Patent Reveals a New Security Feature Coming to Siri", Apr. 4, 2017, reprinted from http://www.patentlyapple.com/patently-apple/2017/04/apple-patent-reveals-a-new-security-feature-coming-to-siri.html, on Aug. 22, 2017 (6 pages).
Patently Mobile, "The Patent behind Google Home's new Feature of Understanding Different Voices in the Home Surfaced Today", Apr. 20, 2017, reprinted from http://www.patentlymobile.com/2017/04/the-patent-behind-google-homes-new-feature-of-understanding-different-voices-in-the-home-surfaced-today.html, on Aug. 22, 2017 (3 pages).
Perez, Sarah, "The first ad network for Alexa Skills shuts down following Amazon's policy changes", Tech Crunch, Jun. 15, 2017, 8 pages.
Porter, Jon, "Amazon Echo Show release date, price, news and features", Tech Radar, Jun. 26, 2017, 11 pages.
Purcher, Jack, Today Google Home's Virtual Assistant can learn its Owner's voice for Security Reasons like Apple's Patent Pending Idea, Apr. 20, 2017, 4 pages.
Riley, Duncan, "TechCrunch—Contextual In-Video Advertising: ScanScout," [online] [Retrieved on Mar. 11, 2011]; Retrieved from the Internet URL: http://www.techcrunch.com/2007/0514/contextual-in-video=-advertising-scanscout/; 5 pages.
Sablich, Justin, "Planning a Trip With the Help of Google Home", New York Times, dated May 31, 2017, 6 pages.
Seifert, Dan, "Samsung's new virtual assistant will make using your phone easier", The Verge, Mar. 20, 2017 (6 pages).
Sherr, Ian, "IBM built a voice assistant for cybersecurity", cnet, Feb. 13, 2017 (2 pages).
Siegal, Daniel, "IP Attys Load Up Apps' Legal Challenges at 'Silicon Beach'", Law360, Los Angeles, California, Feb. 2, 2017 (4 pages).
Simonite, "How Alexa, Siri, and Google Assistant Will Make Money Off You," Web Article, May 31, 2016, technologyreview.com (11 pages).
Simonite, "How Assistant Could End Up Eating Google's Lunch," Web Article, Sep. 23, 2016, technologyreview.com (9 pages).
Smith, Dave, "The Amazon Echo got 2 incredibly useful features thanks to a new update", Business Insider, Jun. 1, 2017, 2 pages.
Techcrunch, 'Cisco and Click.tv?', Jul. 30, 2007, [online] [retrieved on Nov. 26, 2007]. Retrieved from http://www.techcrunch.com/2007/07/30/cisco-and-clicktv/.
Techcrunch, 'Hulu Makes First Acquisition; Chinese Video Startup to Form Backbone of New Service', Sep. 12, 2007, [online] [retrieved on Nov. 26, 2007]. Retrieved from http://www.techcrunch.com/2007/09/12/hulu-makes-first-acquisition-chinese-video-startup.
Techcrunch, 'Video Ads: Every Startup has a Different Solution', Jul. 6, 2007 [online][retrieved on Nov. 26, 2007]. Retrieved from http://www.techcrunch.com2007/07/06/video-ads-somebody-needs-to-solve-this-problem.
U.S. Notice of Allowance for U.S. Appl. No. 11/948,643, dated Feb. 27, 2012 (12 pages).
U.S. Notice of Allowance on U.S. Appl. No. 13/168,904, dated Jan. 10, 2014 (8 pages).
U.S. Notice of Allowance on U.S. Appl. No. 14/278,473 dated Oct. 31, 2016.
U.S. Office Action dated Dec. 9, 2010, for U.S. Appl. No. 11/948,643 (20 pages).
U.S. Office Action for U.S. Appl. No. 13/490,912, dated Apr. 16, 2013, 31 pages.
U.S. Office Action for U.S. Appl. No. 13/490,912, dated Aug. 2, 2012, 25 pages.
U.S. Office Action on U.S. Appl. No. 13/168,904 dated Aug. 7, 2013.
U.S. Office Action on U.S. Appl. No. 13/932,836 dated Aug. 16, 2017 (15 pages).
U.S. Office Action on U.S. Appl. No. 13/932,836 dated Feb. 12, 2015.
U.S. Office Action on U.S. Appl. No. 13/932,836 dated Jun. 24, 2015.
U.S. Office Action on U.S. Appl. No. 13/932,836 dated Apr. 12, 2017.
U.S. Office Action on U.S. Appl. No. 13/932,836 dated Jul. 8, 2016.
U.S. Office Action on U.S. Appl. No. 13/932,836 dated Nov. 16, 2015.
U.S. Office Action on U.S. Appl. No. 13/932,836 dated Nov. 2, 2016.
U.S. Office Action on U.S. Appl. No. 14/190,523 dated May 20, 2016.
U.S. Office Action on U.S. Appl. No. 14/190,523 dated Aug. 21, 2014.
U.S. Office Action on U.S. Appl. No. 14/190,523 dated Dec. 3, 2014.
U.S. Office Action on U.S. Appl. No. 14/190,523 dated Apr. 2, 2015.
U.S. Office Action on U.S. Appl. No. 14/190,523 dated Jun. 6, 2016.
U.S. Office Action on U.S. Appl. No. 14/190,523 dated Aug. 17, 2015.
U.S. Office Action on U.S. Appl. No. 14/190,523 dated Feb. 22, 2017.
U.S. Office Action on U.S. Appl. No. 14/190,523 dated May 26, 2015.
U.S. Office Action on U.S. Appl. No. 14/190,523 dated Nov. 25, 2015.
U.S. Office Action on U.S. Appl. No. 14/278,473 dated May 3, 2016.
U.S. Office Action on U.S. Appl. No. 14/278,473 dated Sep. 23, 2016.
U.S. Office Action on U.S. Appl. No. 15/584,940 dated Aug. 14, 2017 (15 pages).
Willens, Max, "For publishers, Amazon Alexa holds promise but not much money (yet)", Digiday, Jul. 6, 2017, 5 pages.
YuMe Networks, 'About Us', [online] [retrieved on Nov. 26, 2007]. Retrieved from http://yumenetworks.com/about.html.
U.S. Final Rejection for U.S. Appl. No. 14/190,523 dated May 7, 2018.
Abrams, Help users find, interact & re-engage with your app on the Google Assistant, Google Developers Blog, Nov. 15, 2017, 16 pages.
Albrecht, "Alexa, How Can You Be Used in Restaurants?", the spoon, Dec. 10, 2017, 6 pages.
Barr, "AWS DeepLens—Get Hands-On Experience with Deep Learning With Our New Video Camera", AWS News Blog, Nov. 29, 2017, 11 pages.
Buckland et al., "Amazon's Alexa Takes Open-Source Route to Beat Google Into Cars", Bloomberg, Feb. 27, 2018, 6 pages.

(56) References Cited

OTHER PUBLICATIONS

Coberly, "Apple patent filing reveals potential whispering Siri functionality", Techspot, Dec. 14, 2017, 4 pages.
Estes, "Amazon's Newest Gadget Is a Tablet That's Also an Echo", Gizmodo, Sep. 19, 2017, 3 pages.
Foghorn Labs, 10 Tips to Improve the Performance of Google Product Listing Ads, printed from Internet address: http://www.foghornlabs.com/2012/11/21/product-listing-ads-best-practices/, on Mar. 18, 2013, 5 pages.
Google Inc., Products Feed Specification, printed from Internet address: http://www.support.google.com/merchants/bin/answer.py?hl=en&answer=188494#US, on Mar. 18, 2013, 6 pages.
Google Inc., Supported File Formats, printed from Internet address: http://www.support.google.com/merchants/bin/answer.py?hl=en&answer=160567, on Mar. 18, 2013, 1 page.
Heater, "Amazon Alexa devices can finally tell voices apart", TechCrunch, Oct. 11, 2017, 6 pages.
International Search Report and Written Opinion for PCT Appl. Ser. No. PCT/US2017/049713 dated Oct. 25, 2017, 12 pages.
Johnston, "Amazon Whirlwind: New Echo, Plus, Spot, Connect, Fire TV Take the Stage", Twice, Sep. 27, 2017, 4 pages.
Kelion, "Amazon revamps Echo smart speaker family", BBC News, Sep. 27, 2017, 11 pages.
Krishna, "Jim Beam's smart decanter will pour you a shot when you ask", engadget, Nov. 29, 2017, 3 pages.
Lacy, "Improving search and advertising are the next frontiers for voice-activated devices", TechCrunch, Dec. 20, 2017, 13 pages.
Lee, Take Two for Samsung's troubled Bixby assistant, BBC News, Oct. 19, 2017, 6 pages.
Lund, Pamela, Mastering Google Product Feeds and Product Listing Ads $2013 Part 1, found at http://www.blueglass.com/blog/mastering-google-product-feeds-and-product-listing-ads-part-1/#comments, Dec. 28, 2013, 17 pages.
Non-Final Office Action on U.S. Appl. No. 15/395,689 dated Sep. 13, 2018.
Non-Final Office Action on U.S. Appl. No. 15/584,746 dated Oct. 29, 2018.
Novet, et al., "Amazon is getting ready to bring Alexa to work", CNBC, Nov. 29, 2017, 4 pages.
Palladino, "Garmin teamed up with Amazon to make a tiny Echo Dot for your car", ars Technica, Oct. 17, 2017, 2 pages.
Perez, "Alexa's 'Routines' will combine smart home control with other actions, like delivering your news and weather", TechCrunch, Sep. 28, 2017, 10 pages.
Pringle, "'I'm sorry to hear that': Why training Siri to be a therapist won't be easy", CBC News, Sep. 24, 2017, 3 pages.
Unknown Author, "'Dolphin' attacks fool Amazon, Google voice assistants", BBC News, Sep. 7, 2017, 8 pages.
U.S. Final Office Action for U.S. Appl. No. 14/190,523 dated May 7, 2018.
U.S. Notice of Allowance on U.S. Appl. No. 13/932,836 dated Dec. 18, 2017, 7 pages.
U.S. Notice of Allowance on U.S. Appl. No. 15/584,940 dated Feb. 26, 2018, 9 pages.
U.S. Notice of Allowance on U.S. Appl. No. 15/584,940 dated Jan. 30, 2018, 9 pages.
Communication pursuant to Article 94(3) EPC dated Feb. 22, 2019 for Appl. Ser. No. 17768558.3 (8 pages).
DE Office Action for Appl. Ser. No. 11 2017 000 122.6 dated Sep. 5, 2018 (1 page).
International Preliminary Report on Patentability for Appl. Ser. No. PCT/US2017/049713 dated Jul. 11, 2019 (8 pages).
JP Office Action for Appl. Ser. No. 2017-556891 dated Feb. 18, 2019 (13 pages).
KR Office Action for Appl. Ser. No. 10-2017-7031189 dated Nov. 29, 2018 (12 pages).
US Office Action for U.S. Appl. No. 15/395,689 dated Mar. 22, 2019 (13 pages).
US Office Action for U.S. Appl. No. 15/584,746 dated Apr. 2, 2019 (14 pages).
US Office Action for U.S. Appl. No. 15/638,304 dated Jul. 1, 2019 (10 pages).
US Office Action for U.S. Appl. No. 15/638,304 dated Mar. 7, 2019 (12 pages).
US Office Action for U.S. Appl. No. 15/638,324 dated Jul. 8, 2019 (27 pages).
US Office Action for U.S. Appl. No. 15/638,333 dated Jun. 26, 2019 (19 pages).
Yamato et al., "Ubiquitous Service Composition Technology for Ubiquitous Network Environments", NTT Network Service Systems Laboratories, NTT Corporation, vol. 48 No. 2, Feb. 2007, pp. 562-577 (16 pages).
Non-Final Office Action on U.S. Appl. No. 15/395,689 dated Aug. 21, 2019, 13 pages.
Notice of Allowance on U.S. Appl. No.15/584,746 dated Aug. 7, 2019, 8 pages.
Final Office Action for U.S. Appl. No. 15/638,324 dated Jan. 3, 2020 (29 pages).
Non-Final Office Action for U.S. Appl. No. 15/638,304 dated Dec. 2, 2019 (10 pages).

* cited by examiner

EXTRACTING AUDIOVISUAL FEATURES FROM CONTENT ELEMENTS ON ONLINE DOCUMENTS

CROSS-REFERENCE TO RELATED PATENT APPLICATIONS

This application is a continuation of, and claims priority under 35 U.S.C. § 120 to, U.S. patent application Ser. No. 13/295,507, titled "CONTENT-BASED ADVERTISEMENT QUALITY USING MULTIMEDIA ELEMENTS" and filed Nov. 14, 2011, the entirety of which is herein incorporated by reference.

BACKGROUND

Electronic online documents can include content elements. These content elements can be defined for presentation with or within a webpage. Text content of the webpage can be used to identify relevant content. However, some text content may not be relevant to the topic of the webpage. Furthermore, some webpages may lack text content.

BRIEF SUMMARY

At least one aspect is directed to a system for extracting audiovisual features from online document elements. A recognition engine executed on a data processing system having one or more processors can identify a first audiovisual content element on an online document, the first audiovisual content element including image data. The recognition can retrieve a second audiovisual content element from a content provider database, the second audiovisual content element including image data. The recognition engine can extract an image feature from the first audiovisual content element by applying an image feature detection to the image data of the first audiovisual content element. The recognition engine can extract an image feature from the second audiovisual content element by applying the image feature detection to the image data of the second audiovisual content element. The recognition engine can determine an image feature match between the image feature of the first audiovisual content element and the image feature of the second audiovisual content element. The recognition engine can select the second audiovisual content element for display by the client device on the online document based on the image feature match. The data processing system can transmit, via a network interface, the second audiovisual content element to the client device for insertion by the client device in a content slot of the online document, responsive to the selection of the second audiovisual content element.

At least one aspect is directed to a method of extracting audiovisual features from online document elements. A recognition engine executing on a data processing system having one or more processors can identify a first audiovisual content element on an online document, the first audiovisual content element including image data. The recognition can retrieve a second audiovisual content element from a content provider database, the second audiovisual content element including image data. The recognition engine can extract an image feature from the first audiovisual content element by applying an image feature detection to the image data of the first audiovisual content element. The recognition engine can extract an image feature from the second audiovisual content element by applying the image feature detection to the image data of the second audiovisual content element. The recognition engine can determine an image feature match between the image feature of the first audiovisual content element and the image feature of the second audiovisual content element. The recognition engine can select the second audiovisual content element for display by the client device on the online document based on the image feature match. The data processing system can transmit, via a network interface, the second audiovisual content element to the client device for insertion by the client device in a content slot of the online document, responsive to the selection of the second audiovisual content element.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS/FIGURES

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

Figure 1A:
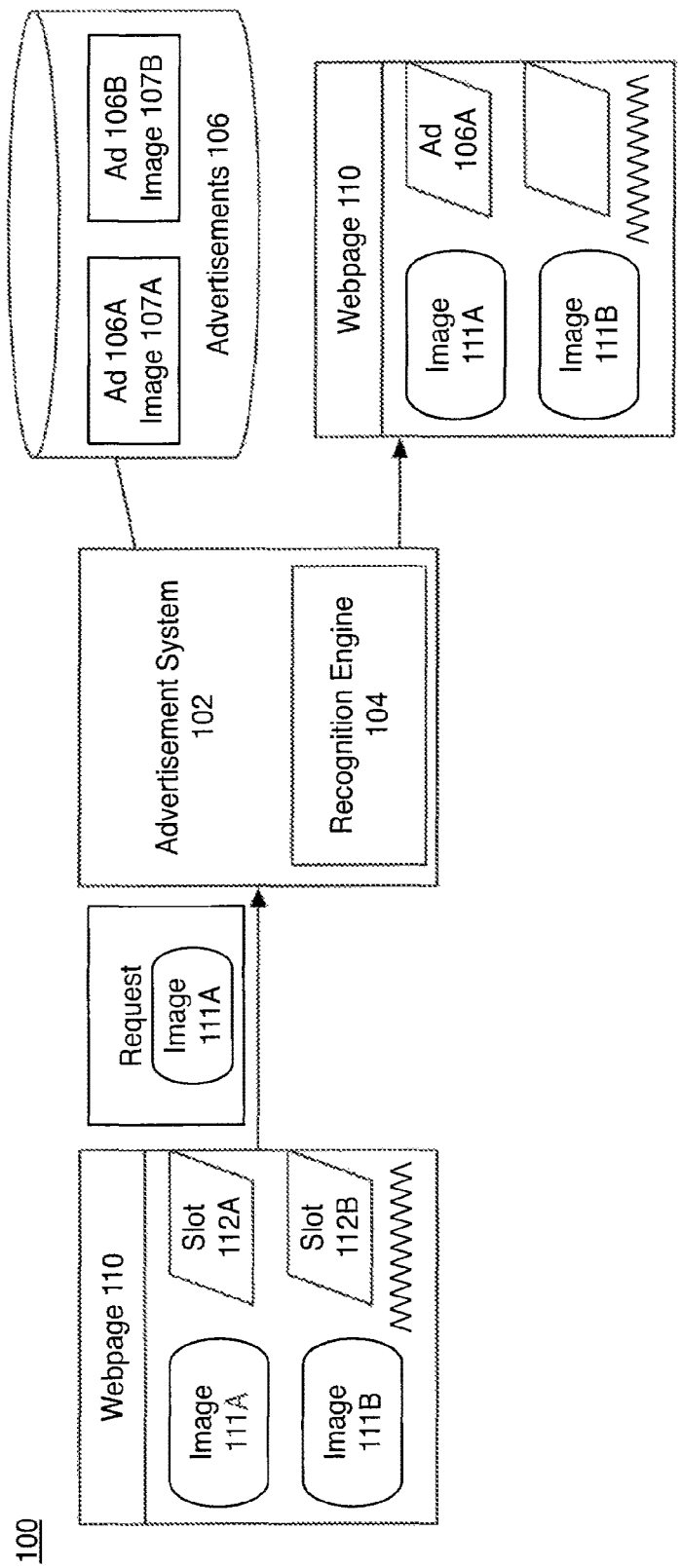
FIGS. 1A and 1B illustrate advertisement selection examples.

Embodiments are described herein with reference to illustrations for particular applications. It should be understood that the invention is not limited to the embodiments. Those skilled in the art with access to the teachings provided herein will recognize additional modifications, applications, and embodiments within the scope thereof and additional fields in which the embodiments would be of significant utility.

An advertisement or an "ad" may refer to any form of communication in which one or more products, services, ideas, messages, people, organizations, or other items are identified and promoted or otherwise communicated. Ads are not limited to commercial promotions or other communications. An ad may be a public service announcement or any other type of notice, such as a broadcast or a public notice published in printed or electronic press. In some implementations, an ad may be referred to or included in sponsored content.

Ads (or promotional or digital content items generally) may be communicated via various mediums and in a number of forms. In some examples, ads may be communicated through an interactive medium, such as the Internet, and may include graphical ads (e.g., banner ads), textual ads, image ads, audio ads, video ads, ads combining one of more of the foregoing formats, or any form of electronically delivered advertisement. Ads may include embedded information, such as embedded media, links, meta-information, and/or machine executable instructions. Ads also may be communicated through RSS (Really Simple Syndication) feeds, radio channels, television channels, print media, and other media.

The term "ad" can refer to both a single "creative" and an "ad group." A creative can refer to any entity that represents one ad impression. An ad impression can refer to any form of presentation of an ad, such that the ad is viewable or receivable by a user. In some examples, an ad impression may occur when an ad is displayed on a display device of a user access device. An ad group can refer, for example, to an entity that represents a group of creatives that share a common characteristic, such as having the same ad targeting criteria. Ad groups can be used to create an ad campaign. For convenience, advertisements and creatives are collectively referred to as "advertisements" herein.

Ads may be included on resources provided by publishers. For example, a publisher may specify one or more areas on a resource, such as a webpage, where advertising is to be displayed. A publisher may also provide a resource such as an application to user devices, and may allow advertisements to be displayed in the application. Relevant advertisements may be identified based on text content included on the resource. Some resources include more multimedia content, such as image content, audio content, or video content, than text content. The text content may not be related to the multimedia content. Thus, irrelevant advertisements may be provided. Further, certain resources include no text content. Embodiments identify relevant advertisements based on multimedia content included on a resource provided by a publisher.

Figure 1B:
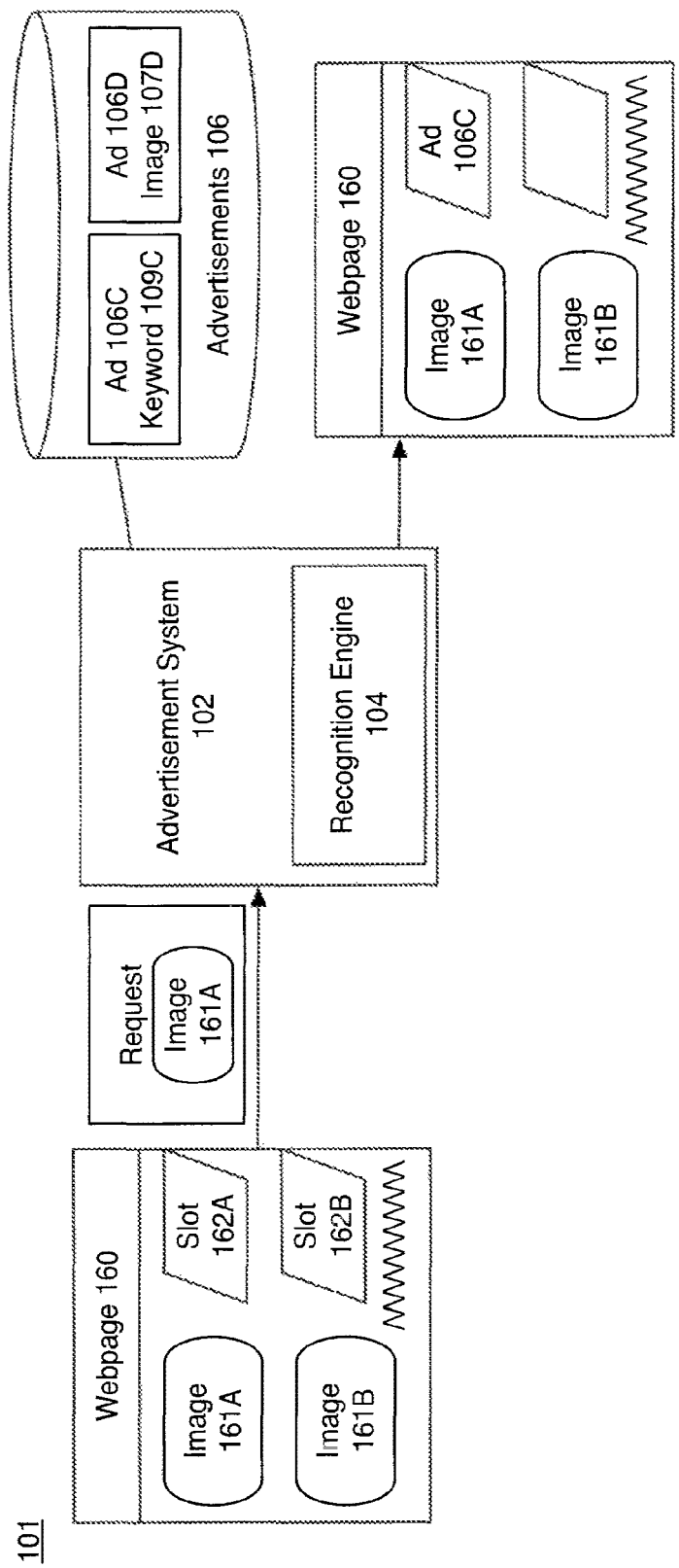

FIGS. 1A and 1B illustrate examples 100 and 101 of providing advertisements in response to multimedia content on a resource. In FIG. 1A, a user may request a publisher resource, such as publisher webpage 110. Publisher webpage 110 includes one or more multimedia elements, such as image 111 and video 113. Publisher webpage 110 may also include text content. Publisher webpage 110 may also include one or more advertisement slots 112A and 112B. When a user requests the publisher webpage, a request for advertisements may be sent to an advertisement system 102, which accesses one or more advertisements 106. Each advertisement 106 may be associated with one or more advertisement multimedia elements, which may include images, video data, or audio data. For example, advertisement 106A is associated with advertisement image 107. Advertisement 106B is associated with video 108.

The advertisement system 102 includes a recognition engine 104 Recognition engine 104 may recognize one or more features of image 111. In one embodiment, the images are sent with the request for advertisements to the advertisement system 102. In another embodiment, features associated with the images are sent to the advertisement system 102. Further, recognition engine 104 may identify features that match between recognized features in image 111 and features of images associated with one or more advertisements 106. For example, recognized features of image 111A may match features of advertisement image 107. Image features may include, for example and without limitation, edges, corner features, interest points, blobs or regions of interest, or ridge features. Based on matching features between image 111 and the images associated with advertisements 106, a relevant advertisement may be identified and provided to the publisher to be displayed on publisher webpage 110 in one of the ad slots 112A or 112B.

In FIG. 1B, a second user may request a second publisher resource, such as publisher webpage 160. Publisher webpage 160 includes one or more multimedia elements, such as video 161 and image 163, and may include text content. Publisher webpage 160 also includes one or more advertisement slots 162A and 162B. When a user requests the publisher webpage 160, a request for advertisements may be sent to an advertisement system 102, which accesses one or more advertisements 106. Each advertisement 106 may be associated with one or more advertisement keywords. For example, advertisement 106C is associated with advertisement keyword 109C. Further, each advertisement 106 may be associated with one or more text labels for an advertisement multimedia element associated with an advertisement. For example, advertisement 106D may be associated with image 107D, which is associated with a text label.

In one embodiment, the multimedia elements are sent with the request for advertisements to the advertisement system 102. In another embodiment, text labels associated with the multimedia elements are sent to the advertisement system 102. Recognition engine 104 may identify a text label associated with video 161. Text labels associated with images and multimedia elements may be, for example and without limitation, query terms input by a user, which resulted in the images or other multimedia elements being displayed to a user and selected by the user. Text labels may also include metadata associated with a multimedia element. Further, text labels or keywords associated with advertisements 106, or text labels associated with multimedia elements associated with advertisements 106 may be identified. For example, recognition engine 104 may identify keyword 109C as being responsive to a text label associated with video 161. For example, text label "daisy" can match keyword "daisy", or be identified as responsive to keyword "flower". Based on the identification of responsiveness, advertisement 106C may be identified as a relevant advertisement and provided to the publisher to be displayed on publisher webpage 160 in one of the ad slots 162A or 162B.

Figure 2:
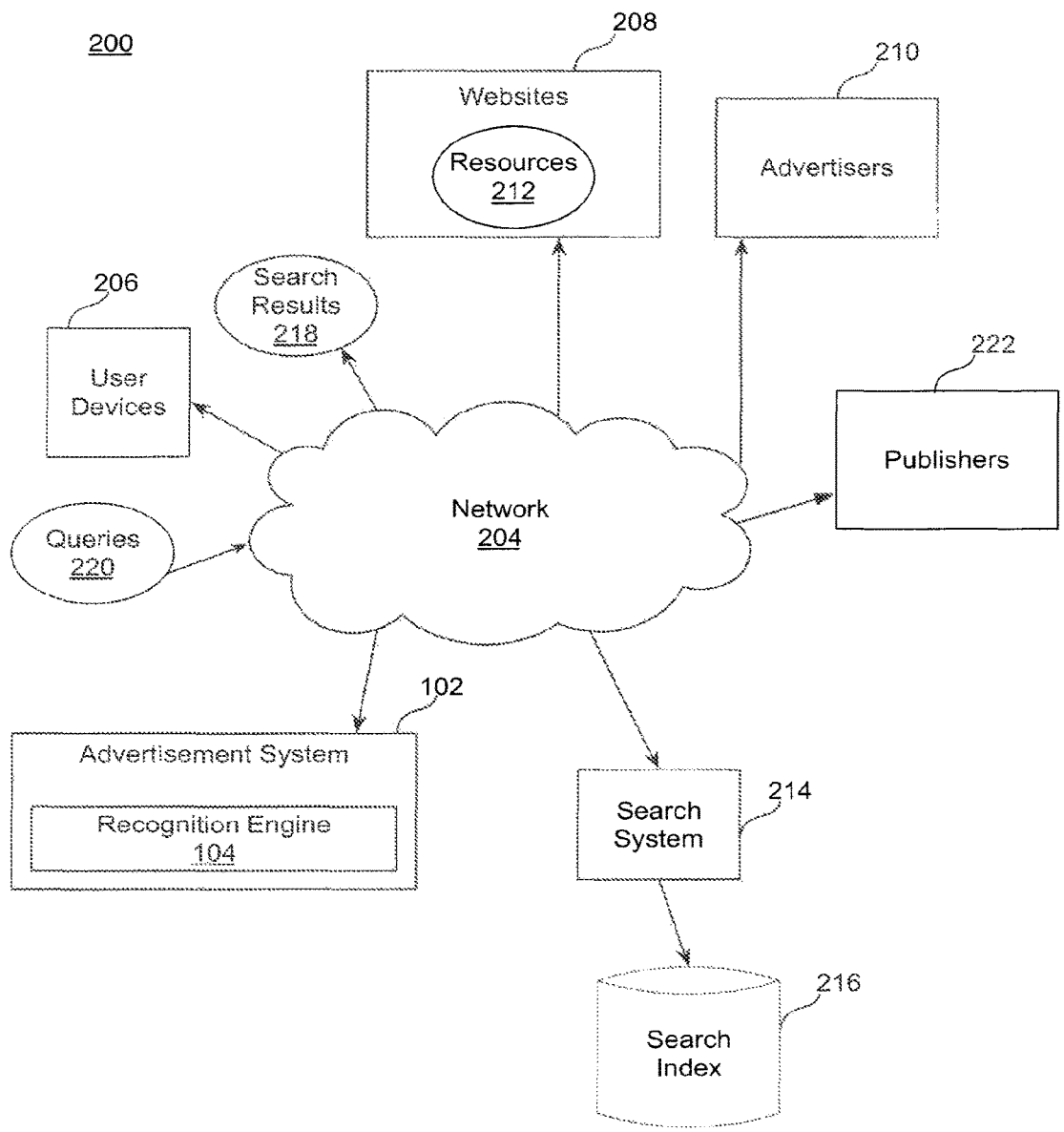
FIG. 2 is a block diagram of an example environment in which an advertisement system manages advertising services.

FIG. 2 is a block diagram of an example environment 200 in which an advertisement system 102 manages advertising services. The example environment 200 includes one or more networks 204, such as a local area network (LAN), a wide area network (WAN), the Internet, or a combination thereof. The network 204 connects user devices 206, websites 208, advertisers 210, and the advertisement system 102. The environment 200 may include many thousands of user devices 206, websites 208, and advertisers 210.

A website 208 is one or more resources 212 associated with a domain name and hosted by one or more servers. An example website is a collection of webpages formatted in hypertext markup language (HTML) that can contain text, images, multimedia content, and programming elements, such as scripts. Each website 208 is maintained by a publisher 222, which is an entity that controls, manages and/or owns the website 208.

A resource 212 is any data that can be provided over the network 204. A resource 212 is identified by a resource address that is associated with the resource 212. Resources include HTML pages, word processing documents, and portable document format (PDF) documents, images, video, and feed sources, to name only a few. The resources can include content, such as words, phrases, images and sounds, that may include embedded information (such as meta-information in hyperlinks) and/or embedded instructions (such as JavaScript scripts).

A user device 206 is an electronic device that is under control of a user and is capable of requesting and receiving resources over the network 204. Example user devices 206 include personal computers, mobile communication devices, and other devices that can send and receive data over the network 204. A user device 206 typically includes a user application, such as a web browser, to facilitate the sending and receiving of data over the network 204. User devices 206, such as mobile communication devices, may also include other user applications, such as text message applications, gaming applications, news applications, book and magazine reader applications, and other applications provided by publishers 222. Applications provided by publishers 222 may also be known as resources.

A user device 206 can request resources 212 from a website 208. In turn, data representing the resource 212 can be provided to the user device 206 for presentation by the user device 206. The data representing the resource 212 can also include data specifying a portion of the resource or a portion of a user display (e.g., a presentation location of a pop-up window or in a slot of a webpage) in which advertisements can be presented. These specified portions of the resource or user display are referred to as advertisement slots.

To facilitate searching of these resources, the environment can include a search system 214 that identifies the resources by crawling and indexing the resources provided by the publishers on the websites 208. Data about the resources can be indexed based on the resource to which the data corresponds. The indexed and, optionally, cached copies of the resources are stored in an indexed cache 216.

User devices 206 can submit search queries 220 to the search system 214 over the network 204. In response, the search system 214 accesses the indexed cache 216 to identify resources that are relevant to the search query 220. The search system 214 identifies the resources in the form of search results 218 and returns the search results 218 to the user devices 206 in search results pages. A search result 218 is data generated by the search system 214 that identifies a resource that is responsive to a particular search query, and includes a link to the resource. An example search result 218 can include webpage title, a snippet of text or a portion of an image extracted from the webpage, and the URL of the webpage. Search results pages can also include one or more advertisement slots in which advertisements can be presented.

When a resource 212 provided by a publisher 222 or search results 218 are requested by a user device 206, the advertisement system 102 receives a request for advertisements to be provided with the resource 212, from a publisher 222, or search results 218. The request for advertisements can include characteristics of the advertisement slots that are defined for the requested resource or search results page, and can be provided to the advertisement system 102.

For example, a reference (e.g., URL) to the resource for which the advertisement slot is defined, a size of the advertisement slot, and/or media types that are available for presentation in the advertisement slot can be provided to the advertisement system 102. Similarly, keywords associated with a requested resource ("resource keywords") or a search query 220 for which search results are requested can also be provided to the advertisement system 102 to facilitate identification of advertisements that are relevant to the resource or search query 220. Further, images and multimedia elements that are associated with the resource may be provided to the advertisement system 102.

Based on data included in the request for advertisements, the advertisement system 102 can select advertisements that are eligible to be provided in response to the request ("eligible advertisements"). For example, eligible advertisements can include advertisements having characteristics matching the characteristics of advertisement slots and that are identified as relevant to specified resource keywords or search queries 220. In some implementations, advertisements having targeting keywords that match the resource keywords or the search query 220 are selected as eligible advertisements by the advertisement system 102. As described with respect to embodiments, advertisements associated with advertisement images with features matching images associated with a resource or webpage may be selected as eligible advertisements by the advertisement system 102.

A targeting keyword can match a resource keyword or a search query 220 by having the same textual content ("text") as the resource keyword or search query 220. For example, an advertisement associated with the targeting keyword "daisy" can be an eligible advertisement for an advertisement request including the resource keyword "daisy." Similarly, the advertisement can be selected as an eligible advertisement for an advertisement request including the search query "daisy."

A targeting keyword can also match a resource keyword or a search query 220 by having text that is identified as being relevant to a targeting keyword or search query 220 despite having different text than the targeting keyword. For example, an advertisement having the targeting keyword "daisy" may also be selected as an eligible advertisement for an advertisement request including a resource keyword or search query for "flowers" because daisy is a type of flower, and therefore, is likely to be relevant to the term "flowers."

As described herein with reference to embodiments, the advertisement system can use features of multimedia elements provided in the request for advertisements from the publisher to identify relevant advertisements. The advertisement system may also use text labels associated with multimedia elements provided in the request for advertisements to identify relevant advertisements.

Search system 214 may provide functionality to users including image search functionality, audio search functionality, and video search functionality. A user may search for images by entering a search query 220 including one or more keywords. For example, the user may enter the search query "handbag" and be presented with a selection of one or more images of handbags or purses. Upon selecting an image, the image may then be associated with the search query term "handbag" as the text label for that image. The image may be provided as part of a publisher webpage. Accordingly, the advertisement system may use this text label to identify relevant advertisements in response to a request for advertisements.

Similarly, a user may search for audio content or video content by entering a search query 220 including one or more keywords. For example, the user may enter the search query "sports car" and be presented with a selection of one or more videos of sports cars or race cars. Upon selecting a video, the video may then be associated with the search query term "sports car" as the text label for that video. The video may be provided as part of a publisher webpage. Accordingly, the advertisement system may use this text label to identify relevant advertisements in response to a request for advertisements.

The advertisement system 102 can select the eligible advertisements that are provided for presentation in advertisement slots of a resource based on results of an auction. For example, the advertisement system 102 can receive bids from advertisers and allocate the advertisement slots to the highest bidders at the conclusion of the auction. The bids are amounts that the advertisers are willing to pay for presentation (or selection) of their advertisement with a resource or search results page. For example, a bid can specify an amount that an advertiser is willing to pay for each 1000 impressions (i.e., presentations) of the advertisement, referred to as a CPM bid. Alternatively, the bid can specify an amount that the advertiser is willing to pay for a selection (i.e., a click-through) of the advertisement or a "conversion" following selection of the advertisement. The highest bidders can be determined based on the bids alone, or based on the bids of each bidder being multiplied by one or more factors, such as quality scores derived from advertisement performance, landing page scores, and the like.

Advertisers can also specify budgets for their advertisement campaigns. A budget is a specified amount that an advertiser is willing to pay for distribution of content over a specified budget period. The specified period can be, for example, a specified time (e.g., one day, one week, or one year), a specified number of events (e.g., a number of impressions or clicks), or some other delineation of time or events. Once the amount the advertiser is charged for distribution of content during the budget period matches or exceeds the budget amount, the campaign can be prevented from providing content for the remainder of the budget period unless the advertiser increases or overrides its specified budget.

A conversion occurs when a user performs a particular action related to an advertisement provided with a resource or search results page. What constitutes a conversion may vary from case to case and can be determined in a variety of ways. For example, a conversion may occur when a user clicks on an advertisement, is referred to a webpage, and consummates a purchase there before leaving that webpage. A conversion can also be defined by an advertiser to be any measurable/observable user action such as, for example, downloading a white paper, navigating to at least a given depth of a website, viewing at least a certain number of webpages, spending at least a predetermined amount of time on a website or webpage, or registering on a website. Other actions that constitute a conversion can also be used.

In one embodiment, advertisements may be computer display advertisements. An advertiser 210 may provide data associated with one or more advertisements, such as an advertiser name, text to be included in an advertisement, keywords, and other information. The advertisement system 202 may generate computer display advertisements based on the received data. For example, the advertisement system 202 may combine the received data into a creative for the advertisement, and generate a computer display advertisement responsive to the keywords specified by the advertiser. In another embodiment, computer display advertisements may be provided by advertisers 210.

In embodiments, advertisement system 102 (and its recognition engine 104) may be implemented in software, firmware, hardware or any combination thereof on one or more computing devices. For example, advertisement system 102 may be part of or may be implemented with a computing device, such as, a processor-based computing device. A computing device can be any type of device having one or more processors. For example, a computing device can be a workstation, mobile device (e.g., a mobile phone, personal digital assistant, tablet or laptop), computer, server, compute cluster, server farm, game console, set-top box, kiosk, embedded system or other device having at least one processor and memory. Embodiments may be software executed by a processor, firmware, hardware or any combination thereof in a computing device.

Examples of providing image advertisements based on the content of a resource are described with reference to FIGS. 3-5. A system that can be used to implement these examples is then described with reference to FIG. 6.

Figure 3:
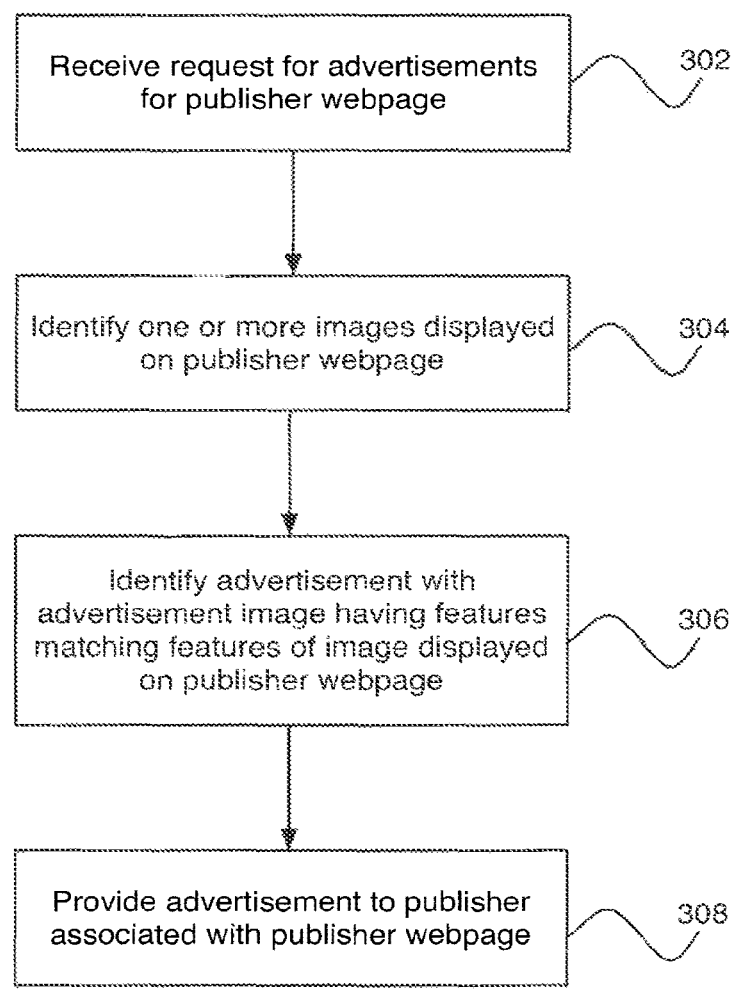
FIG. 3 is a flow diagram illustrating a method for providing advertisements based on content of a resource.
Figure 4:
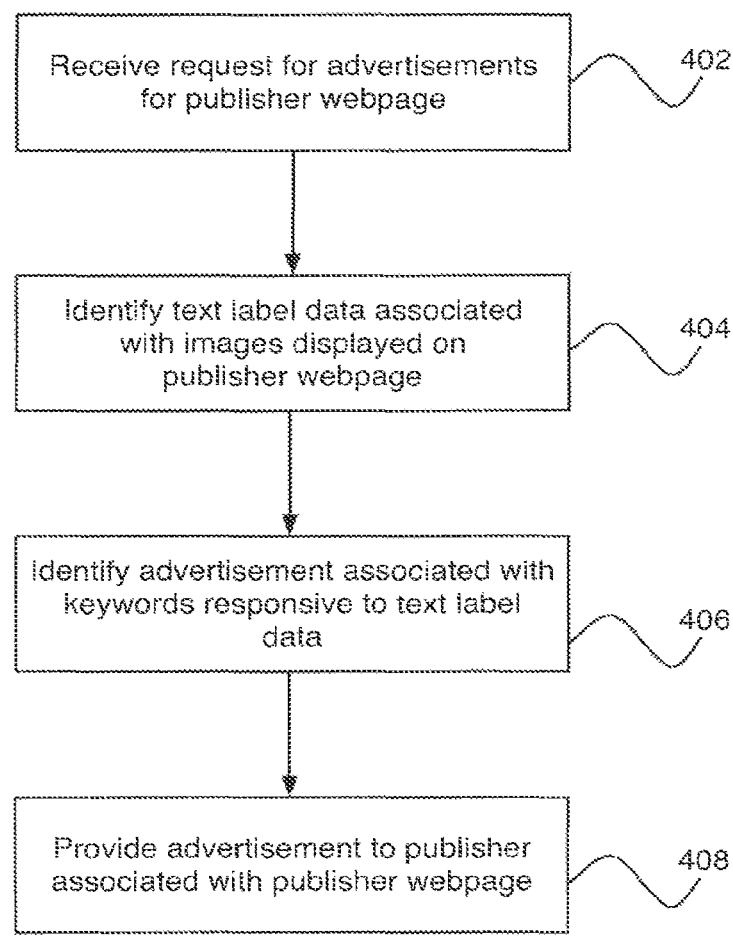
FIG. 4 is a flow diagram illustrating a further method for providing advertisements based on content of a resource.

FIG. 3 illustrates an exemplary method 300 for providing computer display advertisements based on multimedia element content of a resource, according to an embodiment. The process 300 can be implemented, for example, by the recognition engine 104 and/or the advertisement management system 102 of FIG. 2. In some implementations, the recognition engine 104 is a data processing apparatus that includes one or more processors that are configured to perform actions of the process 300. In other implementations, a computer readable medium can include instructions that when executed by a computer cause the computer to perform actions of the process 300.

In step 302, a request for advertisements for a publisher resource is received. The request for advertisements may be received in response to a user requesting a publisher webpage from the publisher, or requesting a resource from a publisher such as an application. The request for advertisements may include one or more multimedia elements displayed on the publisher resource, as well as keywords associated with the content of the publisher resource.

In step 304, one or more multimedia elements displayed on the resource are identified. Further, features of each of the one or more multimedia elements may be extracted. Multimedia elements may include, but are not limited to, images, audio data, video data, animation data, interactive elements of the resource, or other data that may be included on a publisher resource. Feature extraction is further described below.

In step 306, an advertisement associated with an advertisement multimedia element is identified. As described with reference to step 304, advertisement multimedia elements may include, but are not limited to, image, audio data, video data, animation data, interactive elements, or other data. The advertisement can be identified by matching features of the advertisement multimedia element with features of the one on more multimedia elements displayed on the resource. For example, if the multimedia element is an image, one or more edges, corner features, line features, interest points, blobs, regions of interest, or ridges in an image displayed on the publisher resource may match one or more of such features in an advertisement image. Based on this matching, the advertisement associated with the advertisement image may be identified.

In one embodiment, features may be extracted from the images displayed on the publisher's resource using a feature detection technique. Features may include, but are not limited to, edges, corner features, interest points, blobs or regions of interest, or ridges. Feature detection techniques may include, but are not limited to, canny edge detection, scale-invariant feature transform (SIFT), speeded up robust feature (SURF), and other known feature detection techniques. Further, in one embodiment, features may be extracted from advertisement images when an advertisement with an associated advertisement image is provided by an advertiser, such that the features can be matched in response to a request for advertisements.

In one embodiment, an advertisement may be identified if the number of features that match between an image on a publisher resource and an advertisement image meets a threshold. For example, an advertisement may be identified only if five or more features match between an advertisement image associated with the advertisement and an image on the publisher resource. Defining such a threshold may, increase the likelihood that the identified advertisement corresponds to the image content of the publisher resource.

In one embodiment, features of the multimedia elements displayed on the publisher's resource may include text label data. As described above, when a user performs a query for images, video, audio, or other content, the query terms that result in the multimedia element may be associated with the multimedia element after the user selects or clicks on the multimedia element. The query terms may become text label data associated with the multimedia element.

In one embodiment, features of audio data included on a publisher resource may be matched with features of audio data associated with an advertisement. For example, features of the audio data included on the publisher resource may be matched with features of audio data associated with an advertisement by using audio search technique. Such a technique may extract a feature, such as a unique fingerprint of the audio data included on the publisher resource, and compare the unique fingerprint to a fingerprint of audio data associated with an advertisement. If the unique fingerprint matches the fingerprint of audio data associated with an advertisement in part or in whole; the advertisement associated with the audio data may be identified.

In one embodiment, features of video data included on a publisher resource may be matched with features of video data associated with an advertisement. For example, features of video data included on the publisher resource may be extracted and matched with features of video data associated with an advertisement, using a video matching technique. Such a technique may extract individual still frames of each video and compare the still frames to determine whether a video on a publisher resource matches a video associated with an advertisement. If a threshold number of frames matches between the videos, the advertisement associated with the video may be identified. Similarly, image matching techniques as described herein may match individual flames of video data associated with an advertisement to images displayed on a publisher resource. If edges, corner features, or other features of the individual frames of video data associated with an advertisement match features in the image displayed on the publisher resource, the advertisement may be identified.

In one embodiment, the format of the advertisement multimedia element is the same as the format of the multimedia element displayed on the publisher resource. For example, an advertisement associated with a video as its advertisement multimedia element may be identified in response to a request for advertisements from a publisher resource displaying a video. In another embodiment, the format of the advertisement multimedia element is different than the format of the multimedia element displayed on the publisher resource. Thus, for example, an advertisement associated with an image of shoes as its advertisement multimedia element may be identified in response to a request for advertisements from a publisher resource displaying a video of sports players wearing the same or similar shoes. Such an advertisement may be identified using image matching techniques as described above.

In step 308, the advertisement is provided to the publisher associated with the publisher resource. The advertisement may be provided over a computer network to the publisher. The advertisement may then be displayed on the publisher resource along with the content of the publisher resource, FIG. 4 illustrates a further exemplary method 400 for providing computer display advertisements based on multimedia content of a resource, according to an embodiment.

In step 402, a request for advertisements for a publisher resource is received. The request for advertisements may be received in response to a user requesting a publisher resource from the publisher, or requesting a resource from a publisher such as an application, and may include one or more multimedia elements displayed on the publisher resource or other content of the publisher resource.

In step 404, text label data associated with each of the one or more multimedia elements is identified. As described above, query terms associated with a multimedia element may be used as text label data for the multimedia element. Text label data may further be a label associated with the multimedia element which describes the multimedia element. For example, metadata or data associated with the image may be used as text label data. For example, the "alt" or "title" attribute of an HTML image tag may allow a publisher to specify text that is displayed instead of an image or along with an image. Text included in the "alt" attribute may be used to find relevant advertisements.

In step 406, an advertisement associated with a keyword responsive to the text label data is identified. The advertisement can be identified by matching text label data of the multimedia element displayed on the publisher resource to keywords of an advertisement. For example, the advertisement may be associated with a keyword that exactly matches the text label data. Additionally, the advertisement may be associated with a keyword related to the text label data.

In step 408, the advertisement is provided to a publisher associated with the publisher resource. The advertisement may then be displayed on the publisher resource along with the content of the publisher resource.

In one embodiment, the publisher associated with the publisher resource is compensated for displaying the advertisement. For example, the publisher associated with the publisher resource may be compensated an amount corresponding to the bid amount of the provided advertisement.

According to an embodiment, steps 302, 304, 306, and 308 may be performed by the recognition engine 104. Further, steps 402, 404, 406 and 408 may be performed by the recognition engine 104.

Figure 5:
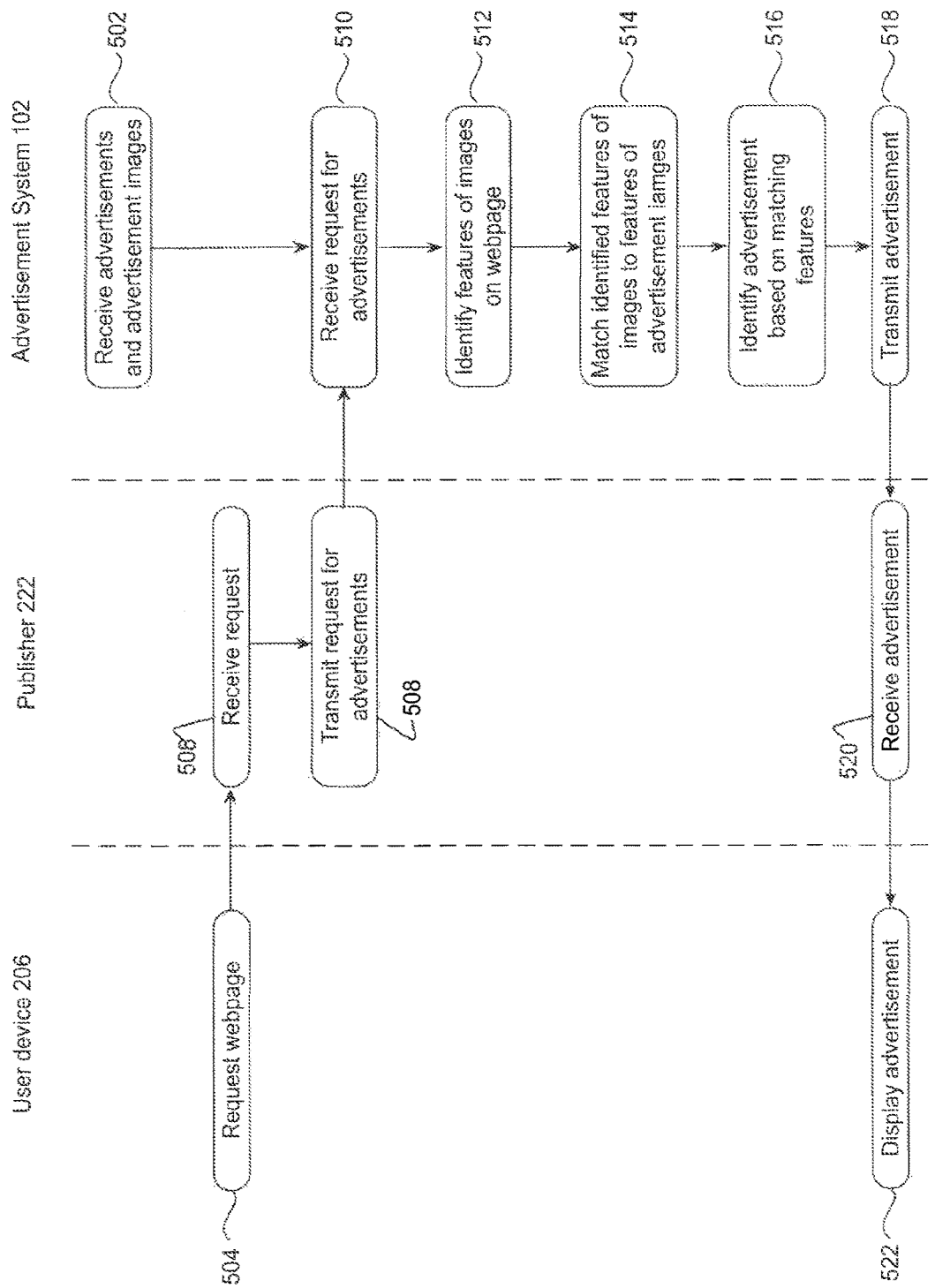
FIG. 5 is a swim lane diagram illustrating a process for providing advertisements based on content of a resource, according to an embodiment.

FIG. 5 is a swim lane diagram illustrating a process for providing computer display advertisements responsive to image content. In box 502, an advertisement system 102 receives computer display advertisements and bids. Each computer display advertisement may be associated with an advertisement multimedia element.

In box 504, a user device requests a resource, such as a webpage. A publisher 222 may receive the request in box 506 and in response may transmit a request for advertisements to advertisement system 102 in box 508. The request may include multimedia elements displayed on the publisher webpage. In box 510, the advertisement system 102 receives the request for advertisements, and in box 512, the advertisement system 102 identifies features of multimedia elements displayed on the publisher webpage, as described herein.

In box 514, the advertisement 102 may match identified features to features of advertisement multimedia elements received in box 502. Based on matching features, in box 516, a computer display advertisement may be identified by advertisement system 102. The advertisement system 102 may then transmit the computer display advertisement to publisher 222 in box 518.

In box 520, the publisher may receive the computer display advertisement, which may then be displayed on the requested webpage in box 522 for presentation to the user device.

Figure 6:
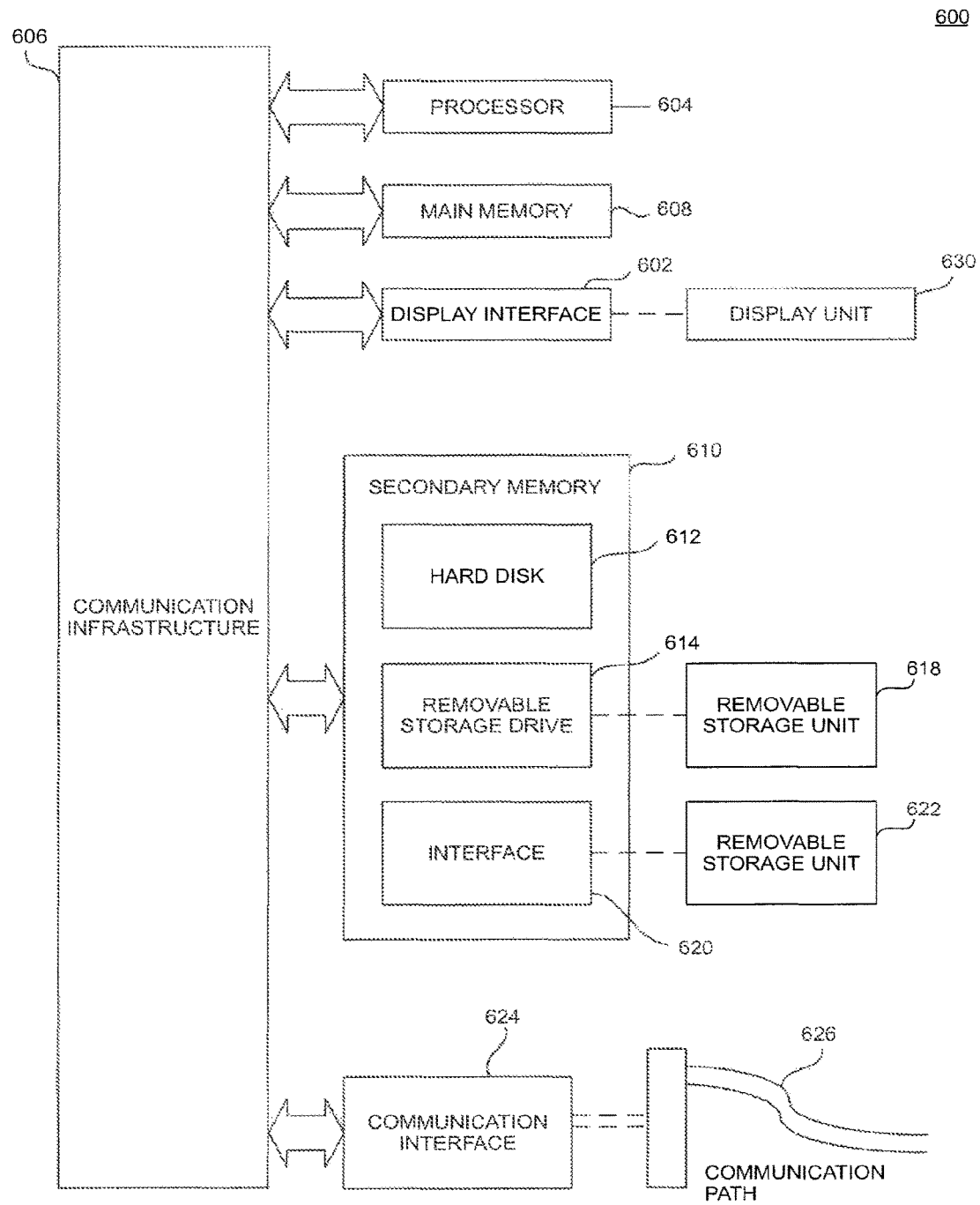
FIG. 6 is a system diagram that can be used to implement embodiments described herein.

FIG. 6 illustrates an example computer system 600 in which embodiments, or portions thereof, may be implemented as computer-readable code. For example, advertisement system 102 may be implemented in computer system 600 using hardware, software, firmware, tangible computer-readable media having instructions stored thereon, or a combination thereof and may be implemented in one or more computer systems or other processing systems. Hardware, software, or any combination of such may embody any of the modules and components in FIGS. 1-5.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above-described embodiments. A processor device may be a single processor, a plurality of processors, or combinations thereof. Processor devices may have one or more processor "cores."

Various embodiments of the invention are described in terms of this example computer system 600. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or—remotely for access by single or multiprocessor machines. In addition, in some embodiments the order of operations may be rearranged without departing from the spirit of the disclosed subject matter.

Processor device 604 may be a special purpose or a general-purpose processor device. As will be appreciated by persons skilled in the relevant art, processor device 604 may also be a single processor in a multi-core/multiprocessor system, such system operating alone, or in a cluster of computing devices operating in a cluster or server farm. Processor device 604 is connected to a communication infrastructure 606, for example, a bus, message queue, network, or multi-core message-passing scheme.

Computer system 600 also includes a main memory 608, for example, random access memory (RAM), and may also include a secondary memory 610. Secondary memory 610 may include, for example, a hard disk drive 612, or a removable storage drive 614. Removable storage drive 614 may comprise a floppy disk drive, a magnetic tape drive, an optical disk drive, a flash memory, or the like. The removable storage drive 614 reads from and/or writes to a removable storage unit 618 in a well-known manner. Removable storage unit 618 may comprise a floppy disk, magnetic tape, optical disk, etc. which is read by and written to by removable storage drive 814. As will be appreciated by persons skilled in the relevant art, removable storage unit 618 includes a computer-readable storage medium having stored therein computer software and/or data.

In alternative implementations, secondary memory 610 may include other similar means for allowing computer programs or other instructions to be loaded into computer system 600. Such means may include, for example, a removable storage unit 622 and an interface 620. Examples of such means may include a program cartridge and cartridge interface such as that found in video game devices), a removable memory chip (such as an EPROM, or PROM) and associated socket, and other removable storage units 622 and interfaces 620 which allow software and data to be transferred from the removable storage unit 622 to computer system 600.

Computer system 600 may also include a communications interface 624. Communications interface 624 allows software and data to be transferred between computer system 600 and external devices. Communications interface 624 may include a modem, a network interface (such as an Ethernet card), a communications port, a PCMCIA slot and card, or the like. Software and data transferred via communications interface 624 may be in the form of signals, which may be electronic, electromagnetic, optical, or other signals capable of being received by communications interface 624. These signals may be provided to communications interface 624 via a communications path 626. Communications path 626 carries signals and may be implemented using wire or cable, fiber optics, a phone line, a cellular phone link, an RFC link or other communications channels.

In this document, the terms "computer program medium" and "computer-readable medium" are used to generally refer to media such as removable storage unit 618, removable storage unit 622, and a hard disk installed in hard disk drive 612. Computer program medium and computer-readable medium may also refer to memories, such as main memory 608 and secondary memory 610, which may be memory semiconductors (e.g. DRAMs, etc.).

Computer programs (also called computer control logic) are stored in main memory 608 and/or secondary memory 610. Computer programs may also be received via communications interface 624. Such computer programs, when executed, enable computer system 600 to implement the present invention as discussed herein. In particular, the computer programs, when executed, enable processor device 604 to implement the processes of the present invention, such as the stages in the method illustrated by flowchart 300 of FIG. 3 or flowchart 400 of FIG. 4 discussed above. Accordingly, such computer programs represent controllers of the computer system 600. Where the invention is implemented using software, the software may be stored in a computer program product and loaded into computer system 600 using removable storage drive 614, interface 620, and hard disk drive 612, or communications interface 624.

Embodiments also may be directed to computer program products comprising software stored on any computer-readable medium. Such software, when executed in one or more data processing device, causes a data processing device(s) to operate as described herein. Embodiments employ any computer useable or readable medium. Examples of tangible computer-readable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A system to extract audiovisual features from online document elements, comprising:
    a recognition engine that executes on a data processing system having one or more processors that:
        receives, from a client device, a request for content to insert into an online document, the online document including a first audiovisual content element loaded into a first content slot and a second content slot, the second content slot separate from the first content slot on the online document, the first audiovisual content element originating from a source different from the content to be inserted into the second content slot and including image data, the request for content related to a search query including the first audiovisual content element and a characteristic of the second content slot;
        retrieves, responsive to receipt of the request for content, a plurality of candidate audiovisual content elements from a content provider database based on the characteristic of the second content slot, the second audiovisual content element including image data;
        extracts an image feature from the first audiovisual content element by applying an image feature detection to the image data of the first audiovisual content element;
        identifies a text label corresponding the first audiovisual content element from a metadata field of the online document;
        extracts an image feature from each candidate audiovisual content element by applying the image feature detection to the image data of the candidate audiovisual content element;
        identifies a keyword of each candidate audiovisual content element, the keyword associated with the candidate audiovisual content element from on a previous search query and a corresponding interaction event;
        determines an image feature match between the image feature of the first audiovisual content element and the image feature of each candidate audiovisual content element;
        determines a keyword match between the text label of the first audiovisual content element from the metadata field of the online document and the keyword of the second audiovisual content from on the previous search query and the corresponding interaction event;
        selects, from the plurality of candidate audiovisual content elements, a second audiovisual content element for display by the client device on the online document based on the image feature match and the keyword match; and
    the data processing system that transmits, responsive to the selection of the second audiovisual content element, via a network interface, the second audiovisual content element to the client device for insertion by the client device into the second content slot of the online document to be presented on the online document with the first audiovisual content element loaded into the first content slot.

2. The system of claim 1, wherein the recognition engine:
    extracts a plurality of image features from the first audiovisual content element by applying an image feature detection to the image data of the first audiovisual content element;
    extracts a plurality of image features from the second audiovisual content element by applying the image feature detection to the image data of the second audiovisual content element;
    identifies a number of image feature matches between the plurality of image features of the first audiovisual content element and the plurality of image features of the second audiovisual content element;
    determines that the number of image feature matches exceeds a threshold number; and
    selects the second audiovisual content element responsive to the determination that the number of image feature matches exceeds the threshold number.

3. The system of claim 1, wherein the recognition engine:
    extracts a first image feature from the first audiovisual content element by applying a first image feature detection to the image data of the first audiovisual content element;
    extracts a first image feature from the second audiovisual content element by applying the first image feature detection to the image data of the second audiovisual content element;
    extracts a second image feature from the first audiovisual content element by applying a second image feature detection to the image data of the first audiovisual content element, the second image feature detection different from the first image feature detection;
    extracts a second feature from the second audiovisual content element by applying the second image feature detection to the image data of the second audiovisual content element; and
    determines a first image feature match between the first image feature of the first audiovisual content element and the first image feature of the second audiovisual content element;
    determines a second image feature match between the second image feature of the first audiovisual content element and the second image feature of the second audiovisual content element; and selects the second audiovisual content element based on the first image feature match and the second image feature match.

4. The system of claim 1, wherein the recognition engine:
retrieves the second audiovisual content element including video data, the video data defining a frame image of the second audiovisual content element;
extracts a video feature from the second audiovisual content element by applying a video frame feature detection to the frame image of the video data of the second audiovisual content element;
determines a video feature match between the image feature of the first audiovisual content element and the video feature of the second audiovisual content element; and
selects the second audiovisual content element based on the image feature match and the video feature match.

5. The system of claim 1, wherein the recognition engine:
identifies the first audiovisual content element including video data, the video data defining a frame image of the first audiovisual content element;
retrieves the second audiovisual content element including video data, the video data defining a frame image of the second audiovisual content element;
extracts a plurality of video features from the second audiovisual content element by applying a video frame feature detection to the frame image of the video data of the first audiovisual content element;
extracts a plurality of video features from the second audiovisual content element by applying the video frame feature detection to the frame image of the video data of the second audiovisual content element;
identifies a number of video feature matches between the plurality of video features feature of the first audiovisual content element and the plurality of video features of the second audiovisual content element;
determines that the number of video feature matches exceeds a threshold number; and
selects the second audiovisual content element responsive to the determination that the number of video feature matches exceeds the threshold number.

6. The system of claim 1, wherein the recognition engine:
identifies the first audiovisual content element including audio data;
retrieves the second audiovisual content element including audio data;
extracts an audio feature from the first audiovisual content element by applying an audio fingerprint detection to the audio data of the first audiovisual content element;
extracts an audio feature from the second audiovisual content element by applying the audio fingerprint detection to the audio data of the second audiovisual content element;
determines an audio feature match between the audio feature of the first audiovisual content element and the audio feature of the second audiovisual content element; and
selects the second audiovisual content element based on the image feature match and the audio feature match.

7. The system of claim 1, wherein the recognition engine:
identifies text label included in the first audiovisual content element;
identifies keyword of the second audiovisual content, the keyword associated with the second audiovisual content based on a previous search query and a corresponding interaction event;
determines a keyword match between the text label of the first audiovisual content element the keyword of the second audiovisual content; and selects the second audiovisual content based on the keyword match.

8. The system of claim 1, wherein the recognition engine generates the second audiovisual content based on one or more specified parameters.

9. A method of extracting audiovisual features from online document elements, comprising:
receiving, by a recognition engine executing on a data processing system having one or more processors, from a client device, a request for content to insert into an online document, the online document including a first audiovisual content element loaded into a first content slot and a second content slot, the second content slot separate from the first content slot on the online document, the first audiovisual content element originating from a source different from the content to be inserted into the second content slot and including image data, the request for content related to a search query including the first audiovisual content element and a characteristic of the second content slot;
retrieving, by the recognition engine, responsive to receipt of the request for content, a plurality of candidate audiovisual content elements from a content provider database based on the characteristic of the second content slot, the second audiovisual content element including image data;
extracting, by the recognition engine, an image feature from the first audiovisual content element by applying an image feature detection to the image data of the first audiovisual content element;
identifying, by the recognition engine, a text label corresponding the first audiovisual content element from a metadata field of the online document;
extracting, by the recognition engine, an image feature from each candidate audiovisual content element by applying the image feature detection to the image data of the candidate audiovisual content element;
identifying, by the recognition engine, a keyword of each candidate audiovisual content element, the keyword associated with the candidate audiovisual content element from on a previous search query and a corresponding interaction event
determining, by the recognition engine, an image feature match between the image feature of the first audiovisual content element and the image feature of each candidate audiovisual content element;
determining, by the recognition engine, a keyword match between the text label of the first audiovisual content element from the metadata field of the online document and the keyword of the second audiovisual content from on the previous search query and the corresponding interaction event;
selecting, by the recognition engine, from the plurality of candidate audiovisual content elements, a second audiovisual content element for display by the client device on the online document based on the image feature match and the keyword match; and
transmitting, by the data processing system, responsive to the selection of the second audiovisual content element, via a network interface, the second audiovisual content element to the client device for insertion by the client device into the second content slot of the online document to be presented on the online document with the first audiovisual content element loaded into the first content slot.

10. The method of claim 9, comprising:
extracting, by the recognition engine, a plurality of image features from the first audiovisual content element by applying an image feature detection to the image data of the first audiovisual content element;
extracting, by the recognition engine, a plurality of image features from the second audiovisual content element by applying the image feature detection to the image data of the second audiovisual content element;
identifying, by the recognition engine, a number of image feature matches between the plurality of image features of the first audiovisual content element and the plurality of image features of the second audiovisual content element;
determining, by the recognition engine, that the number of image feature matches exceeds a threshold number;
selecting, by the recognition engine, the second audiovisual content element responsive to determining that the number of image feature matches exceeds the threshold number.

11. The method of claim 9, comprising:
extracting, by the recognition engine, a first image feature from the first audiovisual content element by applying a first image feature detection to the image data of the first audiovisual content element;
extracting, by the recognition engine, a first image feature from the second audiovisual content element by applying the first image feature detection to the image data of the second audiovisual content element;
extracting, by the recognition engine, a second image feature from the first audiovisual content element by applying a second image feature detection to the image data of the first audiovisual content element, the second image feature detection different from the first image feature detection;
extracting, by the recognition engine, a second feature from the second audiovisual content element by applying the second image feature detection to the image data of the second audiovisual content element; and
determining, by the recognition engine, a first image feature match between the first image feature of the first audiovisual content element and the first image feature of the second audiovisual content element;
determining, by the recognition engine, a second image feature match between the second image feature of the first audiovisual content element and the second image feature of the second audiovisual content element; and
selecting, by the recognition engine, the second audiovisual content element based on the first image feature match and the second image feature match.

12. The method of claim 9, comprising:
retrieving, by the recognition engine, the second audiovisual content element including video data, the video data defining a frame image of the second audiovisual content element;
extracting, by the recognition engine, a video feature from the second audiovisual content element by applying a video frame feature detection to the frame image of the video data of the second audiovisual content element;
determining, by the recognition engine, a video feature match between the image feature of the first audiovisual content element and the video feature of the second audiovisual content element; and
selecting, by the recognition engine, the second audiovisual content element based on the image feature match and the video feature match.

13. The method of claim 9, comprising:
identifying, by the recognition engine, the first audiovisual content element including video data, the video data defining a frame image of the first audiovisual content element;
retrieving, by the recognition engine, the second audiovisual content element including video data, the video data defining a frame image of the second audiovisual content element;
extracting, by the recognition engine, a plurality of video features from the second audiovisual content element by applying a video frame feature detection to the frame image of the video data of the first audiovisual content element;
extracting, by the recognition engine, a plurality of video features from the second audiovisual content element by applying the video frame feature detection to the frame image of the video data of the second audiovisual content element;
identifying, by the recognition engine, a number of video feature matches between the plurality of video features feature of the first audiovisual content element and the plurality of video features of the second audiovisual content element;
determining, by the recognition engine, that the number of video feature matches exceeds a threshold number; and
selecting, by the recognition engine, the second audiovisual content element responsive to determining that the number of video feature matches exceeds the threshold number.

14. The method of claim 9, comprising:
identifying, by the recognition engine, the first audiovisual content element including audio data;
retrieving, by the recognition engine, the second audiovisual content element including audio data;
extracting, by the recognition engine, an audio feature from the first audiovisual content element by applying an audio fingerprint detection to the audio data of the first audiovisual content element;
extracting, by the recognition engine, an audio feature from the second audiovisual content element by applying the audio fingerprint detection to the audio data of the second audiovisual content element;
determining, by the recognition engine, an audio feature match between the audio feature of the first audiovisual content element and the audio feature of the second audiovisual content element; and
selecting, by the recognition engine, the second audiovisual content element based on the image feature match and the audio feature match.

15. The method of claim 9, comprising:
identifying, by the recognition engine, text label included in the first audiovisual content element;
identifying, by the recognition engine, keyword of the second audiovisual content, the keyword associated with the second audiovisual content based on a previous search query and a corresponding interaction event;
determining, by the recognition engine, a keyword match between the text label of the first audiovisual content element the keyword of the second audiovisual content; and
selecting, by the recognition engine, the second audiovisual content based on the keyword match.

16. The method of claim 9, comprising:
generating, by the recognition engine, the second audiovisual content based on one or more specified parameters.

* * * * *